Figure 1:
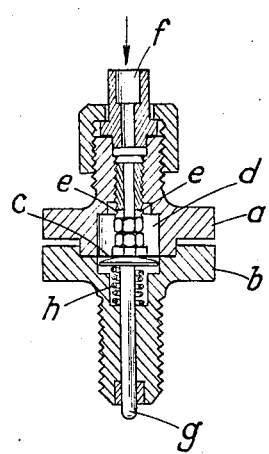

May 21, 1940.  G. GERSON ET AL  2,201,894

PRESSURE REGULATOR

Filed April 20, 1938

Inventors
Gerhard Gerson
Friedrich W. Nagel
By: Mason & Porter
Attorneys

Patented May 21, 1940

2,201,894

UNITED STATES PATENT OFFICE 2,201,894

PRESSURE REGULATOR

Gerhard Gerson, Essen-Rellinghausen, and Friedrich Wilhelm Nagel, Bochum, Germany Application April 20, 1938, Serial No. 203,212
In Germany April 19, 1937

2 Claims. (Cl. 50—26)

This invention relates to an apparatus for reducing the pressure and for maintaining the reduced pressure constant, particularly in internal combustion engines operated with gaseous fuels, for example those which liquefy on compression.

In the operation of internal combustion engines with gaseous fuels, particularly those which liquefy on compression and again vaporise, at least for the greater part, under reduction of pressure, pressure-reducers or pressure-regulating valves are employed, which produce a reduced pressure behind the valve. This reduced pressure constitutes a difference in pressure between the pressure in the cylinder and the engine suction.

If the preliminary pressure is constant, this reduced pressure produced by the pressure-reducer is also to be regarded as practically constant with an engine suction which varies in accordance with the load and the number of revolutions of the engine. Changes in the preliminary pressure however induce changes in this difference in pressure behind the pressure-reducer.

When employing motor fuels, which liquefy on compression, the preliminary pressure at first remains constant, since this pressure corresponds to the vapour pressure of the liquid and accordingly remains the same so long as any liquid is still present in the cylinder.

However with these motor fuels also the preliminary pressure is thereafter changed and together therewith the difference in pressure prevailing behind the pressure-reducer. A reduction in pressure takes place in accordance with the removal of the gaseous residue.

Such an influence on and change in the difference in pressure is less noticeable with full gas load and also with medium loads, nevertheless with slow and neutral running of the engine a marked disturbance is observed, which may even become very considerable and as a result thereof it may no longer be possible to run the engine with frequent stops if only gas is left in the cylinder. In this event this residual gas is not utilised and a freshly filled cylinder is put in operation.

Such a procedure is not to be regarded as being particularly desirable and accordingly the change in the difference in pressure behind the pressure reducer has also proved to be undesirable in the case of those motor fuels, in which the preliminary pressure at first remains constant.

If apparatus are employed in which the reduction in pressure takes place in two stages, in which accordingly a constant intermediate pressure is produced in the first stage with changing preliminary pressure and accordingly the difference in pressure remains practically the same after the second regulator, disadvantages occur owing to the fact that the total quantity of fuel must be introduced into the engine by the reduction in pressure in the preliminary stage. Accordingly a pressure-reducing apparatus with a relatively very thick membrane and a valve connected therewith by a transmission mechanism must be used and this constitutes an additional source of disturbance and gives rise to uncertainties in operation. Moreover the disadvantage is present that already at this point, i. e. in the preliminary stage, additional heat must be supplied since partial evaporation takes place and this requires heat. It is accordingly impossible in this way also to obtain absolutely satisfactory working results.

According to this invention the disadvantages hitherto prevailing are overcome and a constant difference in pressure is produced in a simple manner, even when the preliminary pressure changes.

This is effected by an automatically operating simple and cheap device which, as described below, may also have other advantageous effects.

According to this invention the use of a preliminary stage is avoided and accordingly also the disadvantages attendant thereon.

When employing one-stage pressure reducers, particularly when operating internal combustion engines with a gaseous fuel, a control aggregate is employed, in which a membrane controls a valve in such a way that expansion takes place and the above described difference in pressure is produced.

The membrane and valve are subject to the action of a spring, for example a flat spring.

According to this invention the operation of the membrane and valve is also controlled by the cylinder pressure, in such a way that the difference in pressure is always maintained constant by the action on the membrane and valve, particularly by altering the tension of the aforementioned spring operating with the membrane.

In the case of regulators operating with spiral springs it is also possible to effect such an alteration in the tension of the spring in accordance with the cylinder pressure and in this way to maintain the difference in pressure constant. This may be particularly simply effected with regulating members provided with flat springs.

According to this invention the valve-control member is actuated by an auxiliary regulating device operated and controlled by the cylinder pressure, which preferably acts on the spring attached to the valve-controlling membrane and alters its tension.

Such an auxiliary regulating device may be constructed in various ways, use may for example be made of a membrane of rubber, elastic tube, metal foil and the like, on which the cylinder pressure acts and which for example guides a pin, which acts on the spring. This action may be transmitted by a lever. An auxiliary regulating device without valve and lever is with advantage employed.

The auxiliary regulating device may also consist of a plunger and cylinder, the plunger being directly controlled by the cylinder pressure or through an intervening medium, for example oil.

The auxiliary regulating device is connected with the pressure chamber by a separate union, which may branch before or after the main valve.

This auxiliary regulating device may be particularly successfully employed with an apparatus provided with a leaf spring connected with the membrane. Instead of an adjusting device for the leaf spring, an auxiliary regulating device according to this invention, which operates in accordance with the cylinder pressure, may be employed. Depending on the cylinder pressure, the spring is more or less stretched, since the pin, which is controlled by the membrane of the auxiliary regulating device, presses more or less on the lever arm of the spring.

In this way the difference in pressure is maintained constant without difficulty and in a very simple manner.

Figure 2:
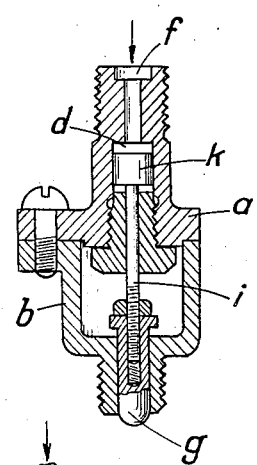
Figure 3:
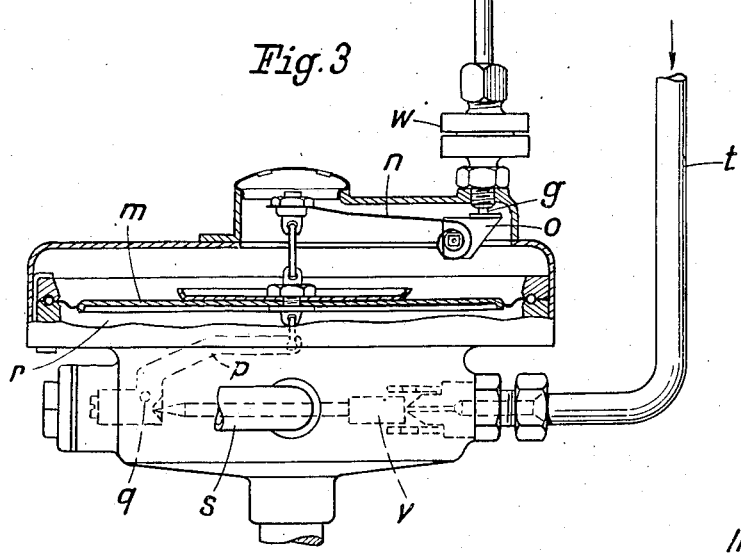

Preferred embodiments of apparatus according to this invention are illustrated in the accompanying drawing, in which:

Figure 1 is a cross-section through an auxiliary regulating device provided with a membrane, Figure 2 is a cross-section through another embodiment of such an apparatus, which operates with a displaceable plunger, and Figure 3 illustrates an auxiliary regulating device mounted in a pressure regulator for motor fuels standing under pressure, which liquefy on compression and are vaporised on reduction of pressure.

Referring to Figure 1 of the drawing, the auxiliary regulating device consists of two adjacent parts $a$ and $b$, between which a membrane $c$ is stretched, which is subject to the action of the pressure of the cylinder, with which the device is connected at $f$. The gas from the pressure cylinder passes through $f$ into the space $d$ and here acts on the membrane $c$. The pin $g$ is displaced downwards in accordance with the degree of pressure prevailing against the action of the spring $h$ and on reduction of the pressure the membrane arches upwards until arrested by the stop $e$.

The device shown in Figure 2 acts in a similar manner. The gas issuing from the cylinder acts through $f$ and $d$ on the plunger $k$, which moves the pin $g$ through the medium of the spindle $i$.

The movement of the pin $g$ causes a spring $n$ (see Figure 3) of a pressure-regulating device above the part $o$ to be more or less stretched whereby the resistance of the membrane $m$ is varied. This membrane $m$ is subject through the reduced pressure pipe $s$ to the action of the reduced pressure of the engine. On reduction of the pressure the membrane $m$ is displaced and through the medium of a lever $p$, $q$ opens a valve $v$, so that compressed gas from the pressure cylinder can flow in through the pipe $t$. A second pipe $u$ connects the pressure cylinder with the auxiliary regulating device $w$. The pin $g$, depending on the cylinder pressure, is more or less depressed and accordingly the resistance of the membrane $m$ is changed. When no liquid is left in the pressure cylinder, the pressure acting on the auxiliary regulating device falls. The pin $g$ is then further depressed and the resistance of the membrane $m$ to sagging is reduced, so that in this event also the difference in pressure remains constant.

What we claim is:

1. Apparatus for reducing the pressure and for maintaining constant the reduced pressure of fluids issuing under pressure from a supply cylinder, comprising a main regulating device including a valve responsive to changes in pressure for controlling the passage of the fluid, an auxiliary regulating device in direct communication only with the supply cylinder and controlled by the pressure in the supply cylinder, and control members including a flat spring interposed between the main and auxiliary regulating devices and acting against the supply pressure on the auxiliary regulating device for connecting said valve with said auxiliary regulating device whereby to automatically regulate the valve according to variations of pressure.

2. Apparatus for reducing the pressure and for maintaining constant the reduced pressure of fluids issuing under pressure from a supply cylinder, comprising a main regulating device including a valve responsive to changes in pressure for controlling the passage of the fluid, an auxiliary regulating device in direct communication with the supply cylinder and including a rod and means for shifting the said rod in accordance with variations in pressure in the supply cylinder; and control members including a flat spring interposed between the main and auxiliary regulating devices and acted upon by movement of said rod whereby to automatically regulate the valve according to variations of pressure.

GERHARD GERSON.
FRIEDRICH WILHELM NAGEL.